United States Patent [19]

Powers et al.

[11] Patent Number: 4,697,614

[45] Date of Patent: Oct. 6, 1987

[54] WATER CONSERVATION SYSTEM

[76] Inventors: Debora L. Powers; John G. Powers, both of P.O. Box 95, Melbourne, Fla. 32902; Eugene L. Rogina, 2235 Pueblo Dr., Billings, Mont. 59102

[21] Appl. No.: 774,365

[22] Filed: Sep. 10, 1985

[51] Int. Cl.[4] .............................................. F16K 49/00
[52] U.S. Cl. ................................. 137/337; 126/362; 138/30
[58] Field of Search ................ 137/337; 126/362; 138/30

[56] References Cited

U.S. PATENT DOCUMENTS

| 1,010,052 | 11/1911 | Hooper | 137/551 |
| 1,522,120 | 1/1925 | Halder | 137/597 |
| 2,832,695 | 2/1958 | Coffin | 137/337 |
| 2,842,155 | 7/1958 | Peters | 137/337 |
| 3,511,280 | 5/1970 | Mercier | 138/30 |
| 3,604,456 | 9/1971 | Jones | 137/597 |
| 3,741,195 | 6/1973 | Ellis | 126/362 |
| 4,160,461 | 7/1979 | Vataru et al. | 137/337 |
| 4,201,518 | 5/1980 | Stevenson | 126/362 |
| 4,321,943 | 3/1982 | Haws | 137/337 |

Primary Examiner—A. Michael Chambers
Attorney, Agent, or Firm—Harvey B. Jacobson

[57] ABSTRACT

The discharge ends of hot and cold water pipes are provided with valved outlets discharging into a common single water outlet and a by-pass pipe communicates the hot and cold water pipes upstream from but reasonably closely adjacent the hot and cold water outlets. A water accumulator is communicated with a mid-length portion of the by-pass pipe, a remotely operable flow-control valve is serially connected in the by-pass pipe intermediate the accumulator and the hot water pipe and an adjustable pressure regulator is serially connected in the cold water pipe closely upstream from the by-pass pipe.

6 Claims, 1 Drawing Figure

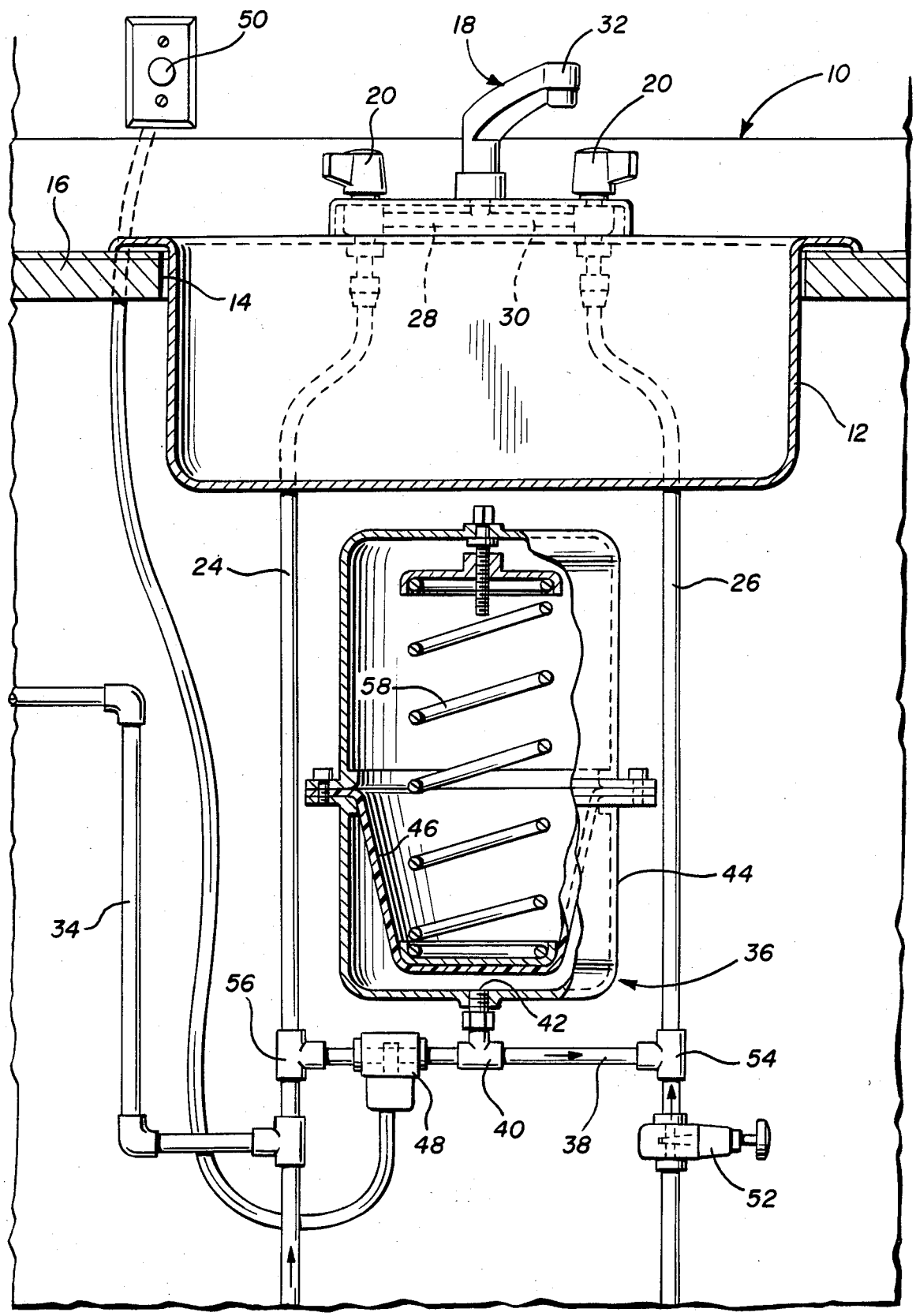

4,697,614

WATER CONSERVATION SYSTEM

BACKGROUND OF THE INVENTION

1. Field of the Invention

This invention relates to structure whereby at least a substantial portion of the water within a hot water pipe extending from a domestic hot water heater to a remote hot water outlet may be received within an accumulator therefor and subsequently discharged from the companion cold water outlet. By such a construction water within the hot water pipe and which has been standing therein for some time and has cooled may be saved and used as cold water. The accumulator is operative to receive substantially that volume of cool water which is contained within the hot water line, after the hot water faucet or other valved outlet may be opened to substantially instantly receive hot water from the hot water heater. The water previously received within the accumulator is automatically released therefrom to the cold water outlet upon the next opening of the cold water outlet.

2. Description of Related Art

Various different structures heretofore have been provided for supplying hot water almost instantly to a hot water outlet and which therefore serve to conserve a major portion of the water discharged from an intermittently used hot water faucet or outlet in some hot water systems wherein a hot water faucet is located reasonably remote from a source of hot water. In addition, other structures have been provided for mixing hot and cold water immediately adjacent hot and cold water outlets. Examples of previously known structures of this type including some of the general structural and operational features of the instant invention are disclosed in U.S. Pat. Nos. 1,010,052, 1,522,120, 3,604,456 and 3,741,195. However, these previously known structures are not designed for or capable of performing the intended function of the instant invention.

SUMMARY OF THE INVENTION

The water conservation system of the instant invention incorporates a by-pass pipe communicating hot and cold water pipes closely upstream from valved outlets of those pipes disposed remote from a source of hot water and the by-pass pipe has a water accumulator communicated therewith. A solenoid valve is interposed in the by-pass line intermediate the accumulator and the hot water pipe and a pressure regulator is interposed in the cold water pipe closely upstream from the point of communication of the by-pass pipe with the cold water pipe.

When it is desired to draw hot water from the valved hot water outlet without wasting that quantity of water disposed within the hot water pipe between the valved outlet and the remote hot water heater, the solenoid valve of the by-pass line is opened and approximately that quantity of cool water within the hot water pipe between the by-pass line and the remote hot water pipe is allowed to flow into the accumulator. By this action hot water flows from the hot water heater to the by-pass line. Thereafter, the solenoid valve is closed and the valved outlet for the hot water line may be opened in order to substantially immediately draw hot water from the hot water pipe. The cool water from the hot water line received into the accumulator is discharged therefrom into the cold water pipe downstream from the pressure regulator upon the next opening of the valved cold water outlet.

The main object of this invention is to provide structure whereby the usual wastage of water from a hot water pipe outlet disposed remote from the source of hot water before hot water reaches the outlet from the remote hot water supply may be eliminated.

Another object of this invention is to provide a water conservation system in accordance with the preceding objects and which may be readily retrofitted to existing adjacent hot and cold water outlet facilities disposed remote from a source of hot water.

Still another important object of this invention is to provide a water conservation system that will not require local plumbing code variances.

A further object of this invention is to provide a water conservation system which may be incorporated in domestic water systems as well as industrial water systems.

A final object of this invention to be specifically enumerated herein is to provide a water conservation system in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

The single drawing figure comprises an elevational view of a typical domestic kitchen area hot and cold water sink faucet installation with which the instant invention has been operatively associated and with the sink, counter and portions of the accumulator structure of the instant invention illustrated in vertical section.

DESCRIPTION OF THE PREFERRED EMBODIMENT

Referring now more specifically to the drawing the numeral 10 generally designates a kitchen sink installation including a kitchen sink 12 downwardly recessed within an opening 14 provided therefor in a kitchen counter 16. A combined hot and cold water faucet assembly 18 is operatively associated with the sink 12 and includes hot and cold water valves 20 and 22 to which the discharge ends of hot and cold water pipes 24 and 26 are operatively connected, the faucet assembly 18 including communicated internal passages 28 and 30 by which hot and cold water supplied to the outlet 32 of the faucet assembly 18 may be variably proportionally mixed by adjustment of the valves 20 and 22.

The hot water pipe 24 has the inlet end of a branch pipe 34 communicated therewith and the outlet end of the branch pipe 34 extends to a dishwasher (not shown) or the like. In addition, the cold water pipe 26 may include a similar branch pipe for supplying cold water to a garbage disposal (not shown), if desired.

The water conservation system of the instant invention is referred to in general by the reference numeral 36 and incorporates a by-pass pipe 38 communicating the hot water pipe 24 and the cold water pipe 26, a short distance upstream from the valves 20 and 22. The by-pass pipe 38 includes a T-fitting 40 serially connected therein and the combined inlet and outlet 42 of an accumulator 44 is communicated with the by-pass pipe 38 through the T-fitting 40. The accumulator 44 includes an internal spring biased diaphragm 46 by which water introduced into the accumulator 44 at a first high pressure may be discharged from the accumulator 44 at a second lower pressure.

The system 36 also includes a solenoid valve 48 serially connected in the by-pass pipe 38 intermediate the T-fitting 40 and the hot water pipe 24 and the solenoid valve 48 includes a remote actuator switch 50 in the form of a push button switch which may be actuated for a specific time interval according to the length of the run of the pipe 24 communicating the by-pass pipe 38 with a remote supply of hot water. Still further, the water conservation system 36 additionally includes an adjustable pressure regulator 52 serially connected in the cold water pipe 26 closely upstream from the T-fitting 54 which communicates the by-pass pipe 38 with the cold water pipe 26, a similar T-fitting 56 communicating the by-pass pipe 38 with the hot water pipe 24.

In operation, and assuming that the internal parts of the accumulator 44 are in the positions thereof illustrated in the single figure of the drawings, and the pressure regulator 52 is set at a pressure somewhat below the pressure of the water in the hot water pipe 24, when it is desired to draw hot water from the outlet 32 without wasting the quantity of cool water in the pipe 24 between the by-pass pipe 38 and the remote hot water heater (not shown), the actuating switch 50 is actuated for a predetermined length of time to allow substantially that quantity of water in the pipe 24 between the by-pass pipe 38 and the remote hot water heater to pass from the hot water pipe 24, through the by-pass pipe 38 and into the accumulator 44. Thereafter, the actuating switch 50 is deactivated and the hot water valve 20 may be opened in order to draw hot water from the outlet 32.

The water received within the accumulator 44 is subsequently discharged therefrom into the cold water pipe 26 the next time the cold water valve 22 is opened to draw cold water from the outlet 32. Inasmuch as the pressure regulator 52 will be adjusted to a pressure somewhat lower than the pressure of water in the hot water pipe 24, as soon as the cold water valve 22 is opened the pressure within the cold water pipe 26 downstream from the pressure regulator 52 will be reduced and the coil spring 58 within the accumulator will cause the diaphragm 46 to express the cold water from the lower portion of the accumulator 44 outward therefrom, through the by-pass pipe 38 and that portion of the cold water pipe 26 downstream from the pressure regulator 52. Of course, the spring 58 must be capable of pressurizing the water within the accumulator 54 to a pressure greater than that pressure for which the pressure regulator 52 is set. For example, the domestic water system of which the water conservation system 36 comprises a part may have an operating pressure of approximately 70 psi. The spring 58 may be capable of producing a water pressure within the accumulator 44 of approximately 50 psi and the regulator 52 may be set for approximately 30 psi.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A water conservation system for use in a water useage location in which valved hot and cold water outlets are located and wherein the outlet ends of hot and cold water supply lines of substantially the same pressure are operatively connected to said outlets, said system including a by-pass line with respective ends communicating said hot and cold water supply lines upstream from but reasonably adjacent said outlets, a remotely operable flow-control valve serially connected in said by-pass line with water accumulator means, said water accumulator means communicated with the interior of said by-pass line on the side of said control valve adjacent said cold water line, and a pressure regulator connected in said cold water line upstream from the point of communication of said by-pass line with said cold water line and operative to limit the pressure in said cold water line downstream from said pressure regulator to a pressure at least somewhat below the first mentioned pressure.

2. The system of claim 1 wherein said flow-control valve comprises a solenoid actuated valve, and an actuator for said solenoid actuated valve located adjacent said valved hot water outlet.

3. The system of claim 1 wherein said pressure regulator comprises an adjustable pressure regulator.

4. The system of claim 1 wherein said hot and cold water outlets open into a single water outlet.

5. The system of claim 4 wherein said flow-control valve comprises a solenoid actuated valve, and an actuator for said solenoid actuated valve located adjacent said valved hot water outlet.

6. The system of claim 5 wherein said pressure regulator comprises an adjustable pressure regulator.

* * * * *